Figure 1:
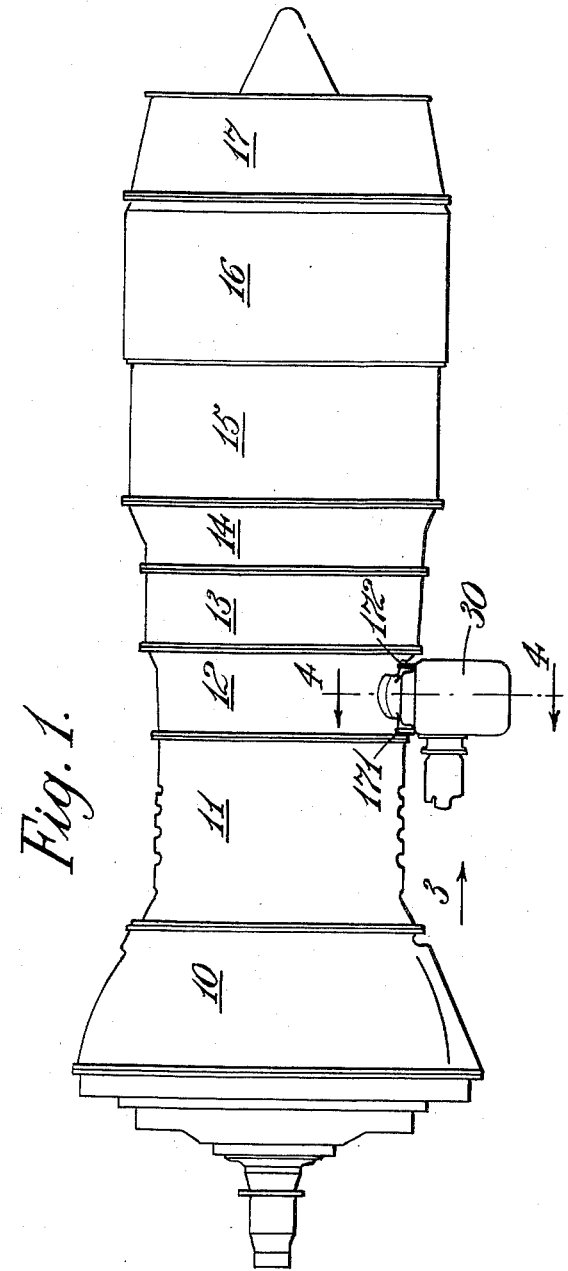

April 11, 1961 G. H. HISCOCK ET AL 2,978,869
ENGINE ACCESSORY MOUNTING ARRANGEMENTS
Filed Oct. 14, 1957 4 Sheets-Sheet 1

United States Patent Office 2,978,869
Patented Apr. 11, 1961

2,978,869

ENGINE ACCESSORY MOUNTING ARRANGEMENTS

George Henry Hiscock and William Edward Dennis Vivian, Bristol, England, assignors, by mesne assignments, to Bristol Siddeley Engines Limited, Bristol, England, a British company Filed Oct. 14, 1957, Ser. No. 690,135

Claims priority, application Great Britain Nov. 1, 1956

4 Claims. (Cl. 60—39.33)

This invention relates to arrangements for securing to the outside of an engine casing an accessory device including a moving part to be connected by a mechanical transmission to a moving part within the engine casing.

Hitherto it has been common practice to provide on the engine casing a flat facing against which a corresponding flat facing provided on the accessory device is applied, the casing and accessory device being held together by bolts or studs passing through the facings. An arrangement of this kind is not very convenient where it is desired to be able to mount a variety of different accessory devices on engines having identical casings since the form of the facing and the disposition of the securing bolts or studs imposes a restriction upon the design of accessory devices it may subsequently be desired to fit. Furthermore, in the case of large accessory devices such as auxiliary gearboxes driving several accessories it is frequently difficult to provide a sufficiently large facing to give adequate support, and difficulties arise due to differential thermal expansion between the accessory device and the engine casing.

The object of the present invention is to provide an accessory mounting arrangement which avoids these objections. According to the invention there is provided an engine accessory mounting arrangement securing to the outside of the engine casing an accessory device having a moving part connected by a mechanical transmission to a moving part within the engine casing, the arrangement comprising a cylindrical wall surrounding an opening in the casing of the engine, connecting means providing a sliding fluid-tight connection between the accessory device and the cylindrical wall while allowing at least slight relative movement between the accessory device and the cylindrical wall in a plane perpendicular to the axis of the latter, and at least two struts each attached at one end to the accessory device and at the other end to the engine casing, said struts constituting the sole means of support and location of the accessory device relatively to the casing, and the mechanical transmission extending from inside said casing to said accessory device through said opening.

Engine casings are frequently already constructed with a sufficient variety of bolted connections, flanges and the like serving as potential places of attachment of the ends of struts supporting accessory devices to cover all likely contingencies, but where this is not the case additional connection means for the attachment of such struts may of course be provided on the engine casing.

According to a feature of the invention, one or more of the supporting struts may be freely hinged to both the engine casing and the accessory device, and one or more others of the supporting struts may be freely hinged only to the engine casing or the accessory device whereby the engine casing and the accessory device are located against relative movement other than that due to thermal expansion. The supporting struts, where freely hinged, may be hinged about axes which are parallel to one another, and where the auxiliary device is of a substantially greater dimension in one direction than at right-angles thereto, said axes are preferably transverse to the direction of the greater dimension of the auxiliary device. In other circumstances however the supporting struts where freely hinged, may be freely hinged about axes which extend in different directions so as to allow in the most favourable manner for dimensional changes due to thermal expansion.

The invention is particularly applicable to the mounting on an engine casing of an auxiliary gearbox arranged to drive several accessory machines such as electrical generators, governors, fuel and lubricating pumps and so on, the accessory machines being removably attached to the outside of the auxiliary gearbox. By this means a basic engine may readily be adapted for use in several different kinds of installation each calling for a different arrangement of accessory machines.

The auxiliary gearbox may also, conveniently, constitute a lubricating oil sump for the engine, and said opening may serve for the transfer of lubricating oil between the engine and the auxiliary device.

Figure 2:
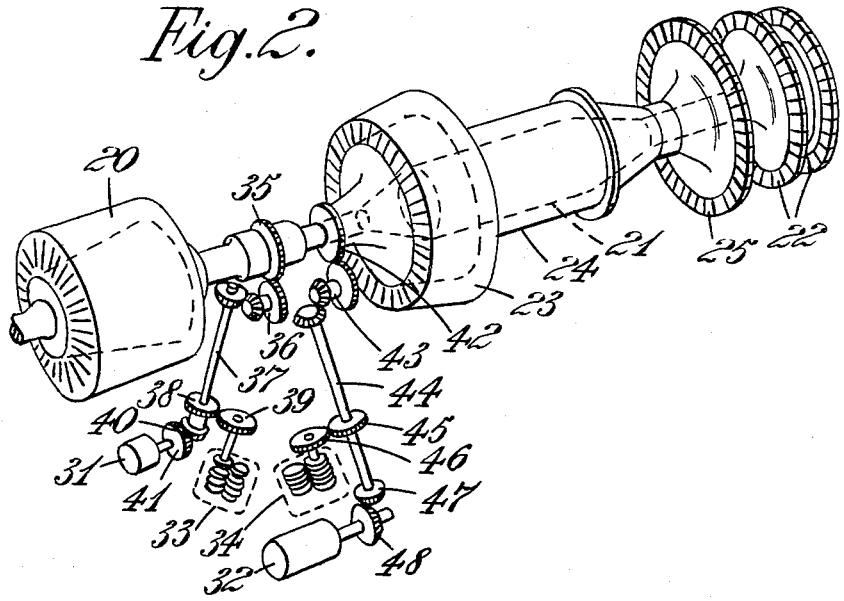
Figure 3:
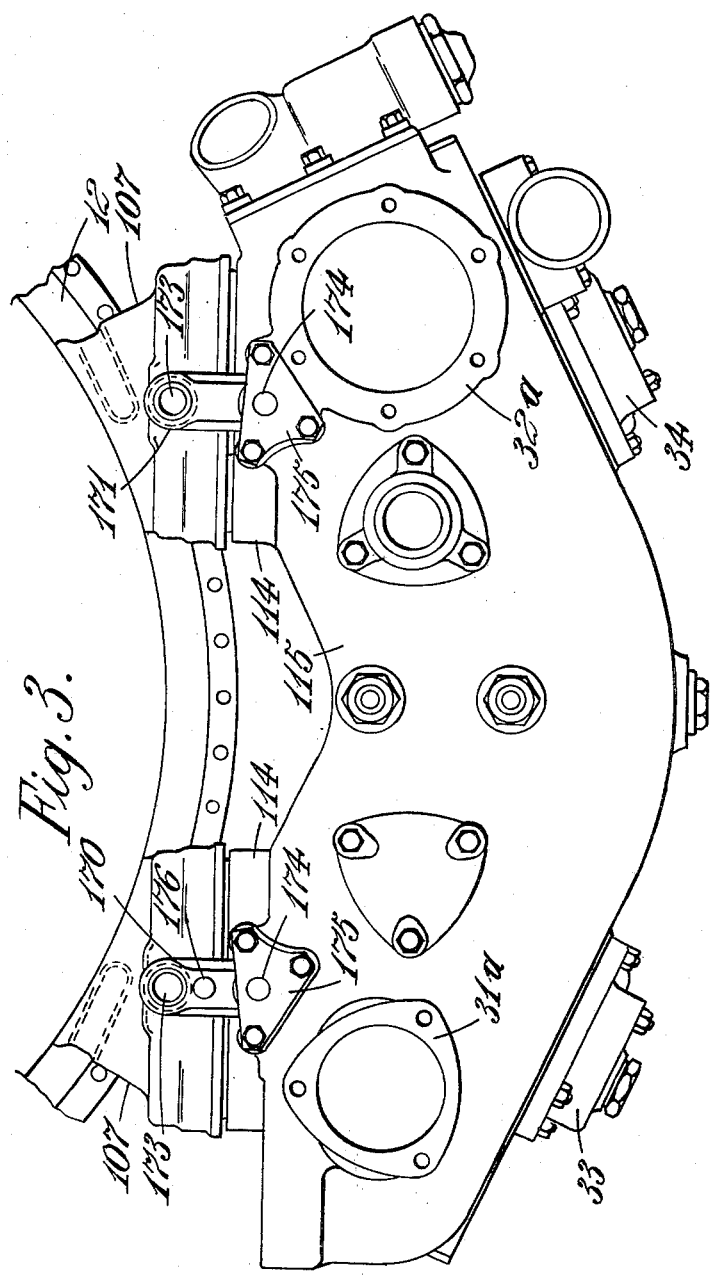
Figure 4:
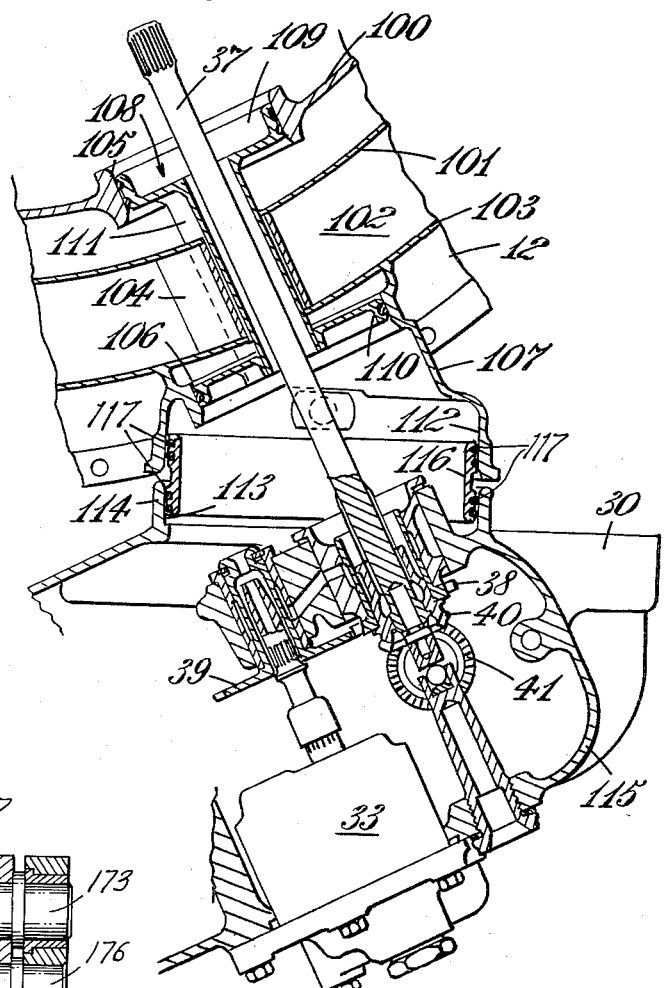
Figure 5:
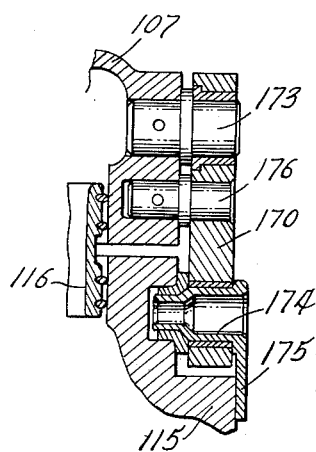

An arrangement according to the invention is illustrated in the accompanying drawings merely by way of example. The drawings show a gas turbine engine provided with an auxiliary gearbox mounted in accordance with the invention, and in the drawings:

Figure 1 is an external view showing the location of the auxiliary gearbox on the main casing of the engine, Figure 2 shows in "skeleton" form the principal moving parts of the engine and gearbox so that the arrangement of the gearing may be more easily understood, Figure 3 is an end view of the gearbox, also constituting a lubricating oil sump for the engine, taken in the direction of the arrow 3 in Figure 1 and drawn to a larger size, Figure 4 is a sectional view taken on a transverse plane through the left hand end of the gearbox-sump shown in Figure 3, that is to say along the line 4—4 in Figure 1 and looking in the opposite direction to the arrow 3, and Figure 5 is a partial cross-section on line 5—5 in Figure 3.

The gas turbine engine shown in Figures 1 and 2 is a propeller engine intended for aircraft propulsion and comprises an air intake and reduction gear casing 10, a low pressure compressor casing 11, an intermediate casing 12, a high pressure compressor casing 13, a delivery casing 14, a combustion equipment casing 15, a turbine casing 16 and an exhaust duct casing 17. All these casings are connected together by flanged joints and together make up the engine casing as a whole.

In Figure 2 the principal rotating parts, other than the propeller drive reduction gear, are shown, and in particular 20 is the low pressure compressor rotor mounted on a shaft 21 also carrying a multi-stage low pressure turbine rotor 22, and 23 is the high pressure compressor rotor mounted on a shaft 24 also carrying a high pressure turbine rotor 25.

The auxiliary gearbox-sump shown at 30 in Figure 1 contains gearing shown in Figure 2 for driving a governor 31 associated with the propeller control system, a fuel pump 32, a low pressure lubricating oil pump 33 and a high pressure lubricating oil pump 34. The pumps 33 and 34 are also shown in Figure 3 but the governor 31 and the fuel pump 32 are not shown, only the faces 31a and 32a to which they are bolted. The governor 31 and the oil pump 33 are driven from a gearwheel 35 mounted on the low pressure compressor shaft 21 through a layshaft 36 and a quill shaft 37. The lower end of the quill shaft 37 drives a spur gear 38 and a bevel gear 40. The spur gear 38 meshes with a spur gear 39 on the pump drive shaft. The bevel gear 40 meshes with a bevel gear 41 on the governor drive shaft. These parts may also be seen in Figure 4. In a very similar manner the fuel pump 32 and the oil pump 34 are driven from a gear-wheel 42 mounted on the high pressure compressor shaft 24 through a layshaft 43 and a quill shaft 44. The lower end of the quill shaft 44 drives a spur gear 45 and a bevel gear 47. The spur gear 45 meshes with a spur gear 46 on the lubricating pump drive shaft and the bevel gear 47 meshes with a bevel gear 48 on the fuel pump drive shaft.

The gearing within the main engine casing, that is to say the gears 35 and 42 and the gears of the layshafts 43 and 36, is contained in an inner gear casing, part of which is shown at 100 in Figure 4, which is supported by an arrangement of links (not shown) within and separated from the hot inner wall 101 of the annular working medium passage 102 of the engine where this extends through the intermediate casing 12. The inner wall 101 of the annular passage is connected to the outer wall 103 by a number of hollow vanes 104 of generally stream-lined shape in cross-section, and each of the quill shafts 37 and 44 extends through one of these vanes into the auxiliary gearbox, an oiltight connection being made between the auxiliary gearbox, engine casing and inner gear casing in a manner which will now be described with reference to Figure 4.

Where the quill shaft 37 passes through the wall 100 of the inner gear casing a circular opening is provided bounded by a cylindrical wall 105, and a concentric cylindrical wall 106 is formed in a coaming-like projection 107 attached to the outer wall 103 of the intermediate casing 12 around the open end of the hollow vane 104. An oiltight connection is made between the cylindrical walls 105 and 106 by a member 108 composed of two pistons 109 and 110 in sliding engagement with the two walls respectively and joined by a tubular part 111 extending through the vane 104. The part 111 is conveniently an elongated oval shape in cross-section so as to take advantage of the greater length than width of the hollow vane 104 and provide space not only for the passage of the quill shaft 37 but also of a lubricating oil supply pipe, not shown. The coaming 107 is formed with a further cylindrical wall 112 arranged co-axially with a cylindrical wall 113 formed on a coaming 114 attached to the casing 115 of the auxiliary gearbox-sump 30. An oil-tight connection is made between the walls 112 and 113 by a sleeve 116 in sliding engagement with both walls by means of "O ring" rubber sealing rings 117, this connection allowing slight freedom of movement in a plane perpendicular to the axis of the cylindrical wall 112. The sealing arrangements at the right hand end of the auxiliary gearbox-sump (as seen in Figure 3) where the quill shaft 44 passes into it are identical with those just described with reference to Figure 4. Oil which has passed through the bearings of the gearing contained in the inner gear casing from a direct supply from the oil pumps, returns through the tubular parts 111 of the double piston members 108 back into the auxiliary gearbox-sump 30.

The auxiliary gear-box-sump is supported and located relatively to the intermediate casing 12 by four struts in the form of links two of which are shown at 170 and 171 in Figure 3 and one of which, 170, is shown in Figure 5. The other two links, one of which is visible at 172 in Figure 1, are similarly arranged at the back of the gearbox-sump. At their upper and lower ends the links are attached to the coamings 107 and to the gearbox-sump casing 115 respectively by pivot pins 173 and 174, the pins 173 being in the nature of trunnions projecting from the coamings while the lower ends of the links are received in recesses in the casing 115 closed by plates 175 which also support the outer ends of the lower pins 174. To prevent a swinging motion of the gearbox-sump relatively to the intermediate casing 12 without substantially impairing the ability of the attachment means to accommodate differential thermal expansions of these parts, the pair of links on the left hand side, as seen in Figure 3 are locked to the coamings 107 by studs 176. The linkage will have the effect of supporting the gearbox-sump on the casing so that a particular point on the gearbox-sump between the pivots 174 of links 170 always remains on a reference line fixed in relation to and extending outwardly from the engine casing, but allowing other points on the gearbox-sump to move freely relatively to the engine casing in a direction perpendicular to the reference line as a result of differential expansion and contraction of the engine casing and the gearbox-sump.

The gearbox-sump, being an assembly of substantially greater dimension in one direction than at right angles thereto, lends itself to a link mounting in which all the axes of the link pivot pins are parallel to one another and transverse to the direction of the greater dimension, but in other cases it may be desirable to provide mounting links having their hinge axes in different directions so as to allow in the most favourable manner for dimensional changes due to differential thermal expansion. Instead of the upper ends of the links being pivoted upon pins carried by the coamings 107 they could quite conveniently be pivoted to anchorage members bolted to the flanges forming the connections between the intermediate casing 12 and the low pressure and high pressure casings 11 and 13 respectively. Also, instead of locking some of the pivoted joints an additional link or links might be provided extending in the direction of movement allowed by the first links so as to prevent movement in that direction.

While the invention has been described as applied to the mounting of an assembly of accessory devices and a common driving gearbox therefor upon an engine casing it is to be understood that the same principle can be applied to the mounting of a single accessory device upon an engine casing.

We claim:

1. A gas turbine engine including an engine casing, an inner wall within the casing and defining with the engine casing an annular working fluid passage, an inner gear casing surrounded by and spaced from said inner wall, a first cylindrical wall surrounding an opening in said inner gear casing, a hollow tube open at both ends extending from the inner wall to the engine casing through the annular working fluid passage, a second cylindrical wall surrounding the open end of the tube remote from said inner casing, a hollow member comprising two pistons in sliding and fluid tight engagement respectively with said cylindrical walls and a tubular part extending through said tube, an accessory device outside said engine casing and a drive transmission extending from said inner gear casing to said accessory device through said hollow member.

2. A gas turbine engine including an engine casing, an inner wall within the casing and defining with the engine casing an annular working fluid passage, an inner casing surrounded by said inner wall, a first cylindrical wall surrounding an opening in said inner gear casing, a hollow tube open at both ends extending from the inner wall to the engine casing through the annular working fluid passage, a second cylindrical wall surrounding the open end of the tube remote from said inner casing, and a hollow member comprising two pistons in sliding and fluid tight engagement respectively with said cylindrical walls and a tubular part extending through said tube.

3. An engine accessory mounting arrangement securing to the outside of the engine casing an accessory device having a moving part connected by a mechanical transmission to a moving part within the engine casing, the arrangement comprising a cylindrical wall of the engine casing and surrounding an opening in the casing, connecting means providing a sliding fluid-tight connection between the accessory device and the cylindrical wall while allowing at least slight relative movement between the accessory device and the cylindrical wall in a plane perpendicular to the axis of the latter, and at least two struts each attached at one end to the accessory device and at the other end to the engine casing, said struts constituting the sole means of support and location of the accessory device relatively to the casing, and the mechanical transmission extending from inside said casing to said accessory device through said opening, the accessory device having a casing provided with an opening surrounded by a cylindrical wall, and said connecting means comprising a sleeve in sliding and fluid sealing engagement with both said cylindrical walls.

4. An engine accessory mounting arrangement securing to the outside of the engine casing an accessory device having a moving part connected by a mechanical transmission to a moving part within the engine casing, the arrangement comprising a cylindrical wall of the engine casing and surrounding an opening in the casing, connecting means providing a sliding fluid-tight connection between the accessory device and the cylindrical wall while allowing at least slight relative movement between the accessory device and the cylindrical wall in a plane perpendicular to the axis of the latter, and at least two struts each attached at one end to the accessory device and at the other end to the engine casing, said struts constituting the sole means of support and location of the accessory device relatively to the casing, and the mechanical transmission extending from inside said casing to said accessory device through said opening, the engine being a gas turbine engine, and said mechanical transmission extending through an opening in an inner gear casing, which inner gear casing is within the engine casing, and through a hollow open ended tube extending across an annular main working fluid passage of the engine defined between the engine casing and an inner wall surrounding and spaced from said inner gear casing, a member composed of two pistons in sliding fluid sealing connection respectively with a cylindrical wall surrounding the opening in said inner gear casing and a cylindrical wall surrounding the outer radially open end of said tube, and a tubular part connecting said pistons, said tubular part surrounding said transmission and extending through said hollow tube.

References Cited in the file of this patent

UNITED STATES PATENTS

| 2,803,943 | Rainbow | Aug. 27, 1957 |

FOREIGN PATENTS

| 628,496 | Great Britain | Aug. 30, 1949 |
| 717,679 | Great Britain | Nov. 3, 1954 |